Figure 1:
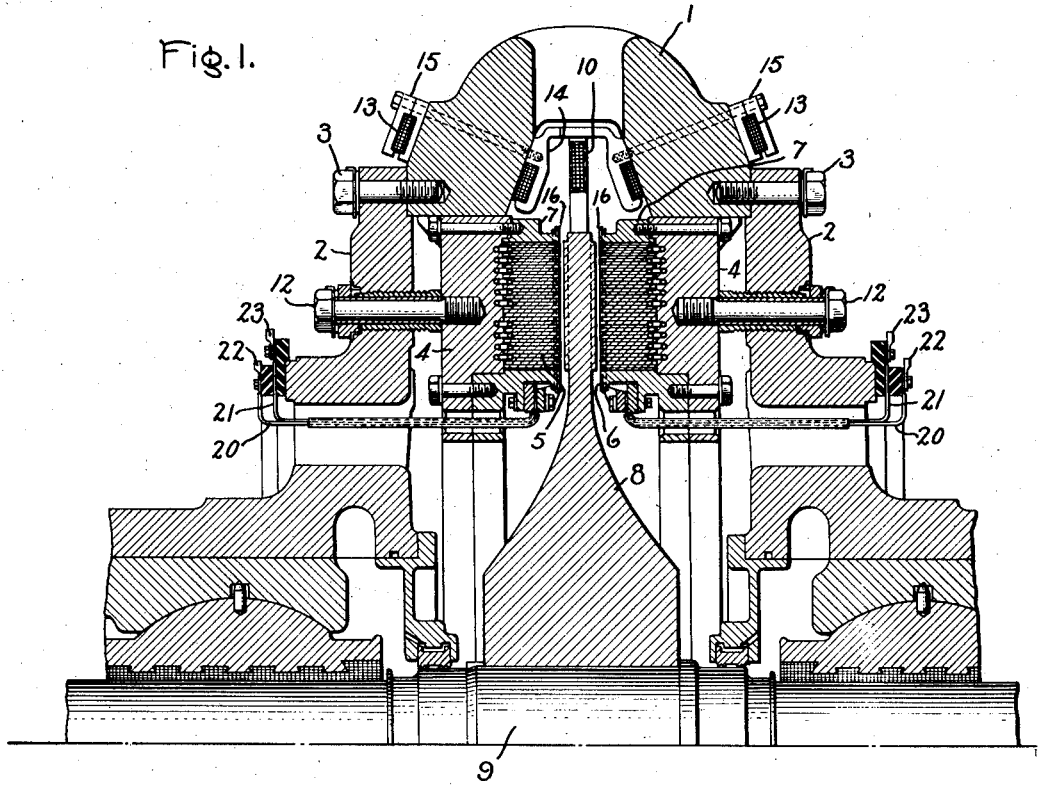

E. F. W. ALEXANDERSON.
COOLING DYNAMO ELECTRIC MACHINES.
APPLICATION FILED NOV. 26, 1918.

1,382,878.

Patented June 28, 1921.

2 SHEETS—SHEET 1.

Inventor:
Ernst F. W. Alexanderson,
by
His Attorney.

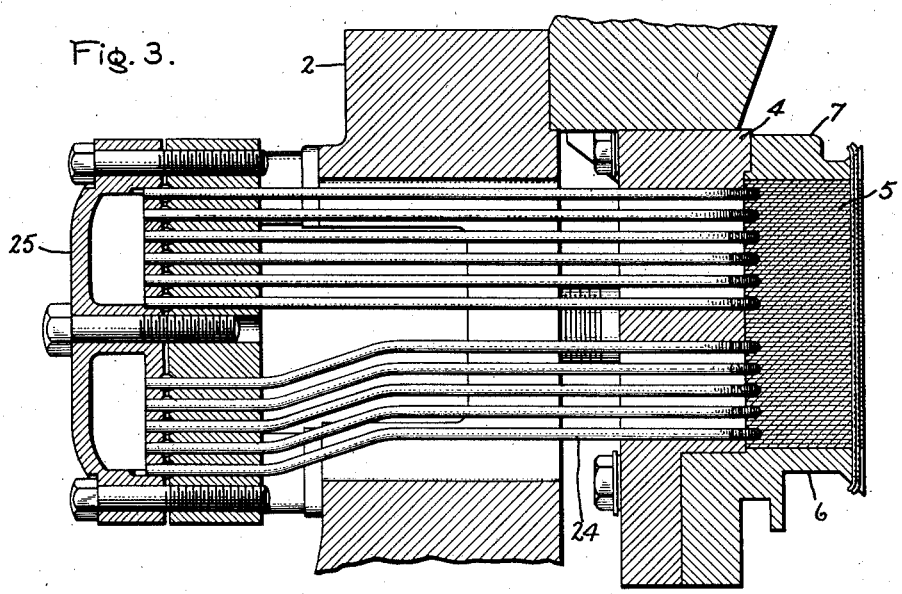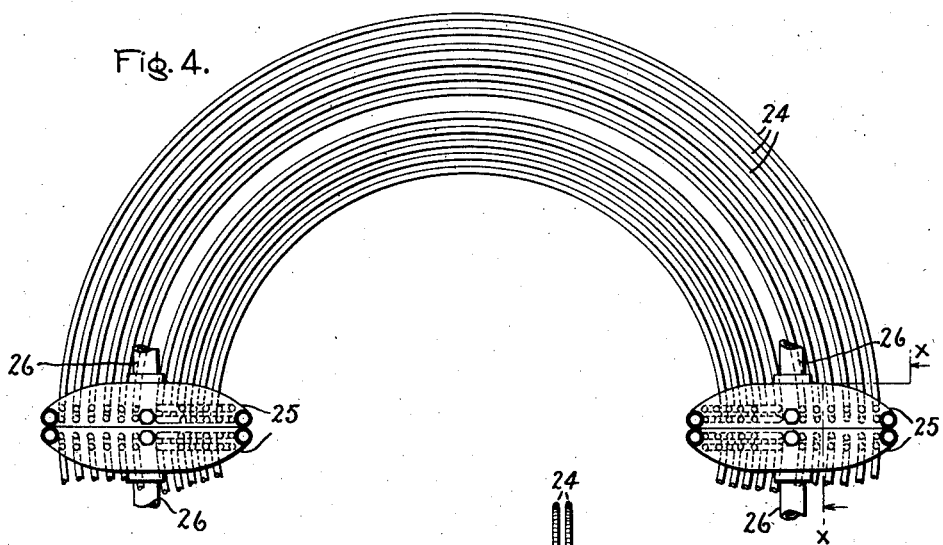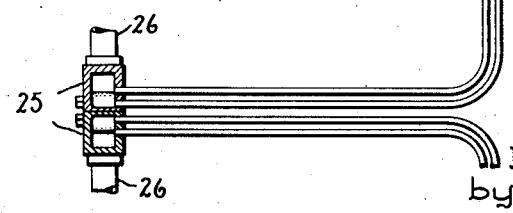

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

COOLING DYNAMO-ELECTRIC MACHINES.

1,382,878.      Specification of Letters Patent.    Patented June 28, 1921.

Application filed November 26, 1918. Serial No. 264,203.

*To all whom it may concern:*

Be it known that I, ERNST F. W. ALEXANDERSON, a citizen of the United States, residing at Schenectady, in the county of Schenectady, State of New York, have invented certain new and useful Improvements in Cooling Dynamo-Electric Machines.

My present invention relates to cooling means for dynamo electric machines and more particularly to means for cooling the armature conductors of a high frequency alternator of the inductor type.

In the construction of high frequency alternators such as those described in my prior U. S. Patent #1,008,577, November 14, 1911, it is desirable, in order to keep the stresses in the rotor as low as possible, to employ a rotating member of as small diameter as possible. A reduction in the diameter of the inductor, however, means that the space available for the armature windings will also be reduced. To construct a machine of large capacity, therefore, it is desirable to provide armature windings which may be operated at a higher current density than has heretofore been employed rather than to increase the diameter of the rotor and thereby increase the amount of space available for the armature windings. The object of my invention, therefore, is to provide an efficient means for cooling the armature conductors so that they may be operated at higher current densities than has previously been possible.

In carrying my invention into effect the armature conductors are wound in slots in a laminated core in the usual manner. If the conductor is embedded in the core in such a way as to be in good heat conductive relation to the core the heat may be carried away from the conductor at such a rate that the conductor can carry without injurious heating a current that would instantly make it red hot and burn it off if it was exposed to the air. One difficulty, however, in operating the armature conductors at such a high current density is that of conducting the current away from the winding without having the conductor burn out at the point where it leaves the slot and is entirely exposed to the air. This difficulty is overcome by providing terminals for the conductors in the form of metal blocks of large mass in proportion to that of the conductor and of good heat conductivity and mounting them so close to the ends of the slots that the armature conductors are exposed for only a very short distance. By reason of the good heat conductivity of the terminal and the core the heat will be carried away from the small portion of the armature conductor, which is exposed, as fast as it is generated.

I also provide special means in the form of a system of pipes in which water or other cooling liquid may be circulated for cooling the core structure more effectively than can be accomplished with air cooling of any form and hence enabling the core to carry the heat away from the armature conductor much faster than would be the case if no special cooling means were employed.

Figure 2:
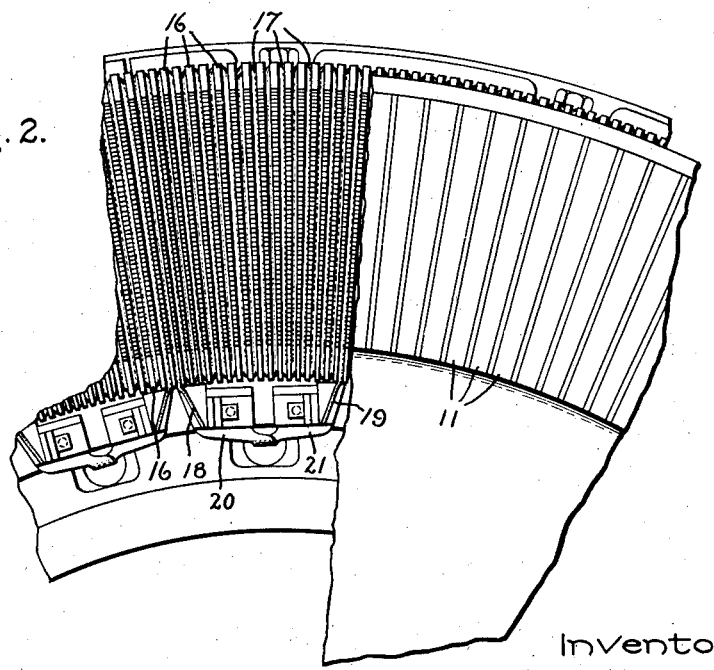

The novel features which I believe to be characteristic of my invention are set forth with particularity in the appended claims. My invention itself, however, will best be understood by reference to the following description taken in connection with the accompanying drawing in which Figure 1 is a vertical cross-sectional view of a high frequency alternator constructed in accordance with my invention; Fig. 2 is a fragmentary view of a portion of the machine showing the arrangement of the armature winding; Fig. 3 is a horizontal sectional view taken near the horizontal center line of the machine showing a portion of the liquid cooling system; Fig. 4 is a view of a portion of the cooling system separated from the machine, and Fig. 5 is a cross-sectional view taken along the line $x—x$ of Fig. 4.

As shown in the drawings, the machine comprises a frame 1 to which are secured the frame heads 2 by means of bolts 3. The frame heads 2 carry end rings 4 which support the circumferentially laminated core rings 5, the laminations being held in place by the clamping rings 6 and 7. The frame 1, the frame heads 2 and the rings 4, 5, 6, and 7, are all divided along the horizontal center line of the machine for convenience in assembling. A solid magnetic conductor 8 is mounted on the shaft 9 so that its periphery extends between the opposite faces of the core rings 5. A field coil 10 which is concentric with the inductor 8 is secured to the frame 1 and the magnetic circuit of this coil includes the frame 1, the end rings 4, the core rings 5 and the periphery of the inductor. The periphery of the inductor 8 is slotted on each side with approximately radial slots as indicated in dotted lines in Fig. 1, so as to form magnetic poles opposite the faces of the laminated core rings 5. In order to avoid excessive windage at the high speeds at which the inductor is designed to operate, the slots in the inductor periphery are filled with non-magnetic members 11 securely fastened therein in any suitable manner.

The air gaps between the inductor and the laminated core rings 5 lie in radial planes and these air gaps may be adjusted by moving the end rings 4 with respect to the frame heads 2 by means of the adjusting bolts 12.

The field coil 7 is preferably made of such proportions that it will be capable of furnishing continuously the entire field excitation required at full load. To insure reliability and continuity of operation, however, two additional field windings are provided, each of which is alone sufficient to furnish the entire field excitation. Each of these windings are made up of two semi-circular coils of which only one, which is indicated as 13, is shown in the drawing. Each of the coils 13 indicated covers half the periphery of the frame on the inside and the return portions of the coils are on the outside of the frame, as indicated. These coils are secured to the frame by means of the inner clamp 14 and the outer clamps 15.

The clamping rings 6 and 7 are both formed with radially extending flanges 16. Both the clamping rings and the laminated core rings 5 are slotted as shown in Fig. 2. Because of the flange formation of the clamping rings, the teeth formed by the slots in the faces of the clamping rings overhang. The armature winding 17 in which the high frequency current is induced, may be formed of a continuous conductor wound zigzag through the slots in the laminated rings and clamping rings and passing under the overhanging ends of the teeth in the clamping rings, which teeth serve to hold the conductor securely in place.

In order to reduce to a convenient minimum the voltage which the insulation of the armature conductors must withstand the armature winding is divided into a plurality of separate circuits. In Fig. 2 I have shown one complete circuit having terminals at 18 and 19. The winding is made up of two multiple layers and is transposed at the middle of its length so that the inner conductor in the slots of any one-half circuit becomes the outer conductor in the slots of the other half of the same circuit. The terminals 18 and 19 are heavy copper blocks provided with slots to receive the armature conductors and mounted on the clamping rings 6 so that the slots in the terminal blocks register with the desired slot in the clamping ring and come as close thereto as it is possible to bring them and still maintain good insulation between the clamping ring and the terminal block. The ends of the armature conductor are soldered securely to the terminal blocks so that the entire winding with the exception of the very short portions between the clamping rings 6 and the terminal blocks 18 and 19, is in good heat conducting contact with the metal. The heat generated in these short portions will be rapidly conducted away to the clamping rings and the terminal blocks, both of which are of large mass in comparison to the mass of the armature conductor associated therewith. Current is conducted from the terminal blocks 18 and 19 by means of heavy conductors 20 and 21 to terminals 22 and 23 which are secured to the frame heads 2.

The means which I provide for cooling the laminated core rings comprises a system of pipes 24 which are located in registering circumferential slots which are cut in the rings 5 and the end rings 4. The cooling liquid is supplied through these pipes from the headers 25 which are located on the outside of the frame of the machine. The cooling system is made up in two parts, as indicated in Figs. 4 and 5, one for each half of the machine. The headers 25 are connected to pipes 26 through which the cooling fluid may be made to circulate by means of any convenient form of pump or gravity circulation system desired. When the pipes 24 are placed in their slots they are preferably secured therein by means of some suitable form of cement which will furnish a good heat conductive union between the pipes and the rings.

What I claim as new and desire to secure by Letters Patent of the United States, is:—

1. The combination in a high frequency alternator of the inductor type, of a pair of circumferentially laminated rings having opposite faces lying in adjacent planes, a winding carried in said faces, a series of circumferential slots in said rings and pipes placed in said slots and adapted to carry a circulating cooling liquid for cooling said rings.

2. The combination in a high frequency alternator of the inductor type of a pair of end rings carrying a pair of circumferentially laminated rings having opposite faces lying in adjacent planes, a winding carried in said faces, registering circumferential slots in said end rings and said laminated rings and pipes placed in said slots and adapted to carry a circulating cooling liquid for cooling said rings.

3. The combination in a high frequency alternator of the inductor type of a pair of end rings carrying a pair of circumferentially laminated rings having opposite faces lying in adjacent planes, a winding carried in said faces, a plurality of registering circumferential slots in each of said end rings and said laminated rings, pipes placed in said slots, two headers to which the opposite ends of all of the pipes in each set of registering slots are respectively connected and connections for supplying a cooling fluid to one of said headers and carrying it away from the other to maintain a circulation of cooling fluid through said pipes.

4. The combination in a high frequency alternator of the inductor type of a stator carrying a pair of circumferentially laminated rings having opposite faces lying in adjacent planes, clamping rings inside and outside of each laminated ring, said laminated rings and clamping rings being slotted in their faces, metal terminal blocks secured to said clamping rings and closely adjacent to the ends of said slots, slots in said terminal blocks registering with slots in said rings, windings extending through said slots and having their terminals securely fastened to said terminal blocks.

5. The combination in a high frequency alternator of the inductor type of a stator carrying a pair of circumferentially laminated rings having opposite faces lying in adjacent planes, clamping rings inside and outside of each laminated ring, said laminated rings and clamping rings being slotted in their faces, metal terminal blocks secured to said clamping rings and closely adjacent to the ends of said slots, slots in said terminal blocks registering with slots in said rings, windings extending through said slots and having their terminals securely fastened to said terminal blocks, and means for artificially cooling said rings comprising a system of pipes embedded therein and adapted to carry a circulating cooling liquid.

6. The combination in a high frequency alternator of the inductor type of a stator carrying a pair of circumferentially laminated rings having opposite faces lying in adjacent radial planes, clamping rings inside and outside of each laminated ring, said laminated rings and clamping rings, being slotted on their faces with approximately radial slots, metal terminal blocks secured to the inner clamping rings and closely adjacent to the ends of said slots, slots in said terminal blocks registering with slots in said rings, a winding extending through said slots in good heat conductive relation to said rings and having its terminals securely fastened to said terminal blocks, said terminal blocks being of large cross-section in comparison with the cross-section of the winding, and means for artificially cooling said rings comprising a system of pipes embedded therein and adapted to carry a circulating cooling liquid.

In witness whereof, I have hereunto set my hand this 25th day of November, 1918.

ERNST F. W. ALEXANDERSON.